J. LYNN.
DUST CAP FOR TIRE VALVES.
APPLICATION FILED APR. 28, 1913.

1,079,781. Patented Nov. 25, 1913.

WITNESSES
Edward Thorpe
J. Edwin Burch

INVENTOR
John Lynn
BY
ATTORNEYS

UNITED STATES PATENT OFFICE.

JOHN LYNN, OF ALICE, TEXAS.

DUST-CAP FOR TIRE-VALVES.

1,079,781.  Specification of Letters Patent.  Patented Nov. 25, 1913.

Application filed April 28, 1913. Serial No. 764,119.

*To all whom it may concern:*

Be it known that I, JOHN LYNN, a citizen of the United States, and a resident of Alice, in the county of Jim Wells and State of Texas, have invented a new and Improved Dust-Cap for Tire-Valves, of which the following is a full, clear, and exact description.

The present invention relates to improvements in dust caps for the inflating valves of pneumatic tires and especially those used on automobiles.

In carrying out my invention, it is my object to provide an improved and simple dust cap which will not only efficiently serve to protect a valve and its casing, as well as exclude all dust therefrom, but which will obviate the disadvantage of caps which must be threaded in place, by providing a separable cap which will require but very few turns to remove or lock it in position by providing means to permit separation of the sections of the cap against means normally tending to clamp the cap in position.

With the above and other objects in view, the invention resides more particularly in the peculiar combinations and arrangements of parts which will be illustrated as a preferred embodiment in the accompanying drawings and described in the specification, although I desire to have it understood that the invention is protected for all desirable changes and uses within the scope of the invention as claimed.

Reference is to be had to the accompanying drawings forming a part of this specification, in which like characters of reference indicate corresponding parts in all the views, and in which—

Figure 1:
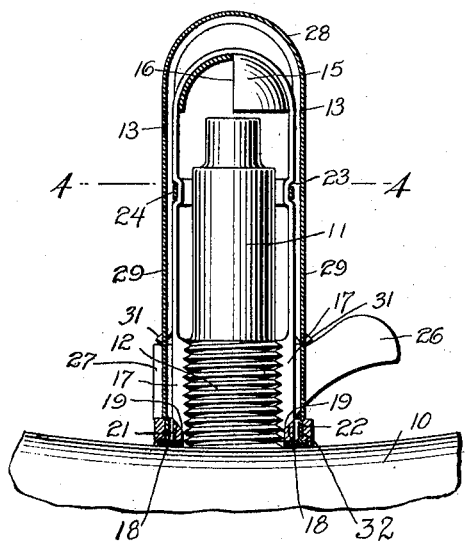
Figure 2:
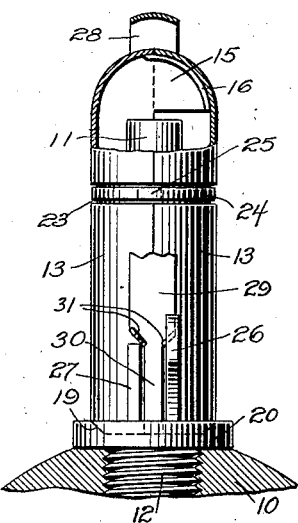
Figure 3:
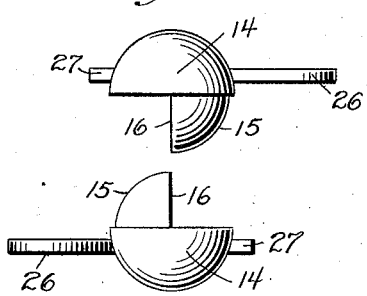
Figure 5:
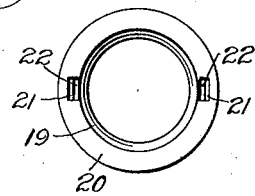
Figure 4:
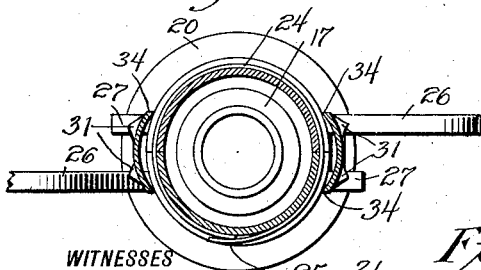
Figure 6:
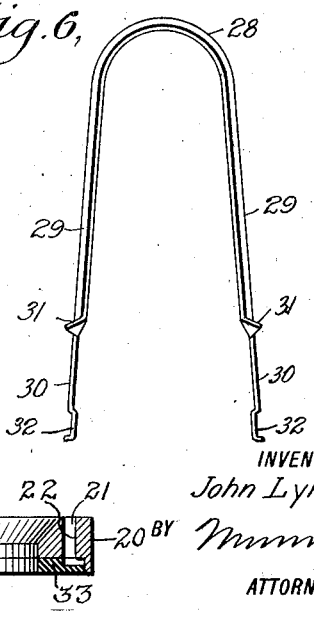
Figure 7:
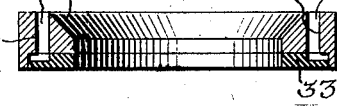

Figure 1 is a vertical sectional view of my improved removable dust cap applied to an inflating valve, the latter being shown attached to a fragmentary section of a tire rim shown in elevation; Fig. 2 is a view taken at right angles to Fig. 1, the rim being shown in section and the cap in elevation, with certain of the parts broken away; Fig. 3 is a plan view of the sections of the cap in disassembled position; Fig. 4 is an enlarged cross sectional view taken on the line 4—4 of Fig. 1 but showing the valve in elevation; Fig. 5 is a plan view of a locking ring or washer employed with the device for positively holding the sections in closed relation; Fig. 6 is an edge view of a spring employed for separating the sections of the cap; and Fig. 7 is an enlarged sectional view of the locking ring, its washer and spring engaged therewith.

In the illustrated embodiment of the invention, I have shown a fragmentary portion 10 of a wheel rim and a tire valve 11 which may be of any preferred form except that the same is exteriorly threaded as shown at 12 near the rim, to thread into the latter if desired. The cap comprises a pair of sections 13 which are semi-circular in cross section, opened at their outer ends but provided with semi-globular inner ends, as shown at 14, adapted when fitted together to produce a circular casing having a rounded end wall.
The inner edges of the portions 14 of the casing sections are provided with inwardly extending segmental or quadrantal extensions 15, the same being located diagonally opposite with respect to the two sections of the cap and being formed by reducing the walls of the sections inwardly; whereby when the sections are brought together these extensions will be inclosed therein with their straight edge portions 16 in contact so that the sections will be held from independent movement or rotation. The sections of the casing near its open end are increased in thickness interiorly, as shown at 17, and correspondingly threaded to engage the threaded portion of the valve casing, and the ends of the casing sections are beveled exteriorly, as shown at 18. The beveled edges 18 coöperate with a beveled countersunk portion 19 of a locking ring or washer 20, which latter is provided with a bore sufficiently large to loosely fit over the threaded portion of the valve casing so as to engage the inner face of the rim, as illustrated in Figs. 1 and 2 of the drawings. This locking ring is also provided with a pair of diametrically opposite recesses 21 communicating with its inner face, and each having a bead 22 projecting inwardly from its outer wall for a purpose as will hereinafter appear. The casing sections 13 are further provided nearer their closed ends with depressions 23 which, when the sections are together, are disposed in alinement to receive a band or ring-like spring 24 with its ends disposed in overlapped relation, as indicated at 25, and normally tending to hold the edges of the sections in binding contact to produce a joint which will exclude all dust from entering the valve. The sections 13 are each provided with wing extensions 26 located at the same sides at which the extensions 15 are located and slightly spaced from the edges of the sections, while each section is also provided with an oppositely extending and similarly located lug 27, which lugs and wing extensions 26 producing grasping members, will be spaced apart when the sections are in contact, as clearly shown in Figs. 2 and 4 of the drawings.

Engaged over the cap so as to overlie the co-acting edges of the sections forming the same, is a substantially U-shaped spring 28, preferably formed of spring steel of curved cross section, the curvature of the spring being of a slightly smaller radius than that of the cap. The restricted end of the spring substantially conforms to the spherical closed end of the cap, but is normally spaced from the latter, and the leg portions 29 of the spring normally diverge from said restricted portion so that their natural tendency is to move outwardly beyond the parallel position. These leg portions are reduced in width near their free extremities as shown at 30, and the corners of the metal at the juncture of the reduced portions are bent at right angles to form substantially triangular and enlarged bearing portions 31 adapted to engage the adjacent wings and lugs 26 and 27 when the reduced portions of the spring are fitted there-between.

When the spring 28 is in the latter position, the hooked extremities 32 of its leg portions are engaged in the recesses 21 of the locking ring, and it will be observed that the shank portions of the hooks are disposed in a common line with the bills of the hooks so that the bight portions of the hooks will engage the beads 22 due to the expansive action of the leg portions of the spring and thus removably anchor the spring to the locking ring. It will, however, be apparent that by compressing the spring said hooks may be disengaged from the beads and the recesses, whereby the spring may be shifted longitudinally on the cap, guided between the co-acting wings and lugs before-mentioned, and when the parts are in position, as shown in Figs. 1 and 2 of the drawings, an air-tight joint is produced by a washer 33 mounted in a recess in the ring, said recess forming an extension engaged with the rim, thus holding the parts against accidental displacement.

In the use of the device as above described, when the cap is attached to the valve casing, the cap is taken in one hand with the restricted portion of the U-shaped spring engaging the palm of the hand, and by catching the fingers under the grasping portions 26 and pressing down on the spring to move the restricted end of the latter toward the cap, the locking ring which is anchored or attached to the leg portions of the spring to move bodily therewith, will be moved in spaced relation to the beveled ends of the cap sections. Further movement of the spring will cause the wedge-like engaging portions produced by the rebent corners 31 to move between the lugs 27 and the wings 26 so as to spread the sections of the cap apart against the action of the band spring 24, when the overlapped portions of the latter will move over one another, and inasmuch as the threaded portions of the cap sections will be spaced apart a distance greater than the diameter of the threaded portion of the valve casing, the cap may be freely slipped over the casing. With the cap thus engaged on the valve casing and the ring engaged with the washer 33, the spring is shifted in the opposite direction to permit the spring 24 to react and move the sections of the cap together, thus engaging the threaded portions 17 with the threaded portions of the casing and causing the beveled edges 18 of the sections to contact with the beveled walls of the locking ring.

In removing the cap while the hooked extremities of the spring are engaged in the recesses of the locking ring, the cap is rotated in the opposite direction a few turns by the grasping portions 26 and the locking ring will be spaced from the rim. After this the spring is forced in position to wedge between the lugs and wings heretofore described, thus spreading the sections against the action of the band spring 24, whereby the cap may be instantly removed or lifted off of the valve by displacing the threaded portions of the sections from the threaded portion of the valve casing.

Owing to the fact that the longitudinal edges 34 of the spring 28, due to the particular curvature of the spring, snugly engage the exterior faces of the cap sections at either side of their co-acting edge portions, the entrance of dust between the sections is further obviated. Attention is also called to the fact that the straight edges 16 of the extensions 15 at the closed ends of the cap sections engage each other so that independent rotation of the sections, as well as spacing apart of the said ends, is prevented.

Having thus described my invention, what I claim as new and desire to secure by Letters Patent is:—

1. A dust cap for tire valves comprising a pair of sections normally held in contact, wedge means for spreading the sections to apply and remove the cap, said sections being threaded to engage the valve casing, and a locking ring removably carried by the spreading means and engageable by the sections to cause binding engagement of the latter with the valve casing.

2. A removable dust cap for valves, comprising a pair of sections each having an open end and a closed end, said sections having depressions, a spring engaged in the depressions to hold the edges of the sections in contact, a grasping wing and a lug extending from each section spaced from its longitudinal edges and in opposed relation, a U-shaped spring engaged on the cap and movable longitudinally with respect thereto, said spring having its leg portions disposed between a spaced wing and lug and formed with a tapered portion to spread the sections when moved between said wings and lugs, and means for clamping the sections to a valve casing.

3. A dust cap for tire valves comprising a pair of sections normally held in contact, means for spreading the sections to apply and remove the cap, said sections being threaded to engage the valve casing, and a locking ring removably carried by the spreading means and engageable by the sections to cause binding engagement of the latter with the valve casing, said sections having extensions received by the opposed sections to hold the sections against independent movement.

4. A removable dust cap for valves having threaded portions adjacent to their point of attachment to a wheel rim, comprising a pair of sections each having an open end and a closed end, said sections having depressions, a spring engaged in the depressions to hold the edges of the sections in contact, a grasping wing and a lug extending from each section spaced from its longitudinal edges and in opposed relation, a U-shaped spring engaged on the cap and movable longitudinally with respect thereto, said spring having its leg portions disposed between a spaced wing and lug and formed with a tapered portion to spread the sections when moved between said wings and lugs, said sections having thickened interiorly threaded portions at their open ends to be engaged on the threaded portion of the valve when the sections are spread apart, and means carried by the spring to cause binding contact of the threaded portions when the sections are rotated by the wings.

5. A removable dust cap for valves having threaded portions adjacent to their point of attachment to a wheel rim, comprising a pair of sections each having an open end and a closed end, said sections having depressions, a spring engaged in the depressions to hold the edges of the sections in contact, a grasping wing and a lug extending from each section spaced from its longitudinal edges and in opposed relation, a U-shaped spring engaged on the cap and movable longitudinally with respect thereto, said spring having its leg portions disposed between a spaced wing and lug and formed with a tapered portion to spread the sections when moved between said wings and lugs, said sections having thickened interiorly threaded portions and beveled ends to be engaged on the threaded portion of the valve when the sections are spread apart, a locking ring having a bore provided with a beveled portion engageable by the beveled portions of the sections, said spring having hooked terminals and the ring having recesses removably engageable by the terminals, whereby when said terminals are disengaged from the recesses the cap sections may be rotated to attach and remove the same, and means for forming an airtight joint between the ring and the rim.

In testimony whereof I have signed my name to this specification in the presence of two subscribing witnesses.

JOHN LYNN.

Witnesses:
ESTELLE KITZING,
T. D. PITTS.

---

Copies of this patent may be obtained for five cents each, by addressing the "Commissioner of Patents, Washington, D. C."